United States Patent [19]

McKean

[11] Patent Number: 4,590,826
[45] Date of Patent: May 27, 1986

[54] COMBINATION STUD DRIVING TOOL AND TORQUE LIMITING DEVICE

[75] Inventor: John A. McKean, Fairview, Pa.

[73] Assignee: Titan Tool Company, Fairview, Pa.

[21] Appl. No.: 490,620

[22] Filed: Feb. 17, 1983

Related U.S. Application Data

[63] Continuation-in-part of Ser. No. 466,069, Feb. 14, 1983, Pat. No. 4,513,643, which is a continuation-in-part of Ser. No. 360,821, Mar. 24, 1982, Pat. No. 4,470,329, which is a continuation-in-part of Ser. No. 265,706, May 21, 1981, abandoned, and a continuation-in-part of Ser. No. 405,365, Aug. 5, 1982, abandoned, which is a continuation of Ser. No. 179,444, Aug. 19, 1980, abandoned.

[51] Int. Cl.⁴ .......................................... B25B 19/00
[52] U.S. Cl. .................................................. 81/53.2
[58] Field of Search ......................................... 81/53.2

[56] References Cited

U.S. PATENT DOCUMENTS

| | | | |
|---|---|---|---|
| 2,492,307 | 12/1949 | McKean | 81/53.2 |
| 2,531,456 | 11/1950 | McKean | 81/53.2 |
| 3,793,912 | 2/1974 | Bilz | 81/53.2 |
| 4,371,354 | 2/1983 | McKean | 464/36 |
| 4,470,329 | 9/1984 | McKean | 81/53.2 |
| 4,513,643 | 4/1985 | McKean | 81/53.2 |

*Primary Examiner*—James L. Jones, Jr.
*Attorney, Agent, or Firm*—Parkhurst & Oliff

[57] ABSTRACT

There is provided a connector for use between rotatably driven tools, preferably an upper tool which is a torque limiting device, and a lower tool which is a stud driving tool. The connector has a driven head disposed within a socket of an adapter housing, the driven head further being disposed within the body of the lower tool when the combination is assembled. The connector can also allow the body of the lower tool to be freely rotatable with respect to both the adapter housing and the driven head when assembled. Both the torque limiting device and the stud driving tool can be of improved configurations themselves.

17 Claims, 3 Drawing Figures

COMBINATION STUD DRIVING TOOL AND TORQUE LIMITING DEVICE

CROSS-REFERENCE TO RELATED APPLICATIONS

This application is a continuation-in-part of the application entitled "AUTOMATIC STUD DRIVING TOOL" filed Feb. 14, 1983, Ser. No. 466,069, now U.S. Pat. No. 4,513,643, which is in turn a continuation-in-part of application Ser. No. 360,821 filed Mar. 24, 1982, now U.S. Pat. No. 4,470,329 which is itself a continuation-in-part of application Ser. No. 265,706 filed May 21, 1981. The application entitled "AUTOMATIC STUD DRIVING TOOL" filed Feb. 14, 1983 (Ser. No. 466,069, now U.S. Pat. No. 4,513,643) is also a continuation-in-part of application Ser. No. 579,288, filed Feb. 14, 1984, now U.S. Pat. No. 4,476,749 which is a continuation of application Ser. No. 405,365 filed Aug. 5, 1982, which is a continuation of application Ser. No. 179,444 filed Aug. 19, 1980. Application Ser. Nos. 265,706, 405,365, and 179,444 are now abandoned.

BACKGROUND OF THE INVENTION

This invention relates to torque transmitting connectors between machine tools, and more specifically relates to such connectors between automatic stud driving tools and torque limiting devices. The automatic stud drivers to which this invention relates are typically able to grasp a stud and thread it into a workpiece, and are then capable of automatically releasing the stud without the requirement that the stud be unthreaded from the tool. Torque limiting devices of the type to which this invention relates are typically those which have an as an input a high torque input, and provide means for disengaging the input torque from the output of the torque limiting device when a predetermined maximum torque at the output is encountered.

OBJECTS OF THE INVENTION

The principle object of the present invention is to provide a torque transmitting connector between two rotating machine tools, in particular between a torque limiting device and an automatic stud driving tool. This connector should be small in dimension to allow the combined tool to be used in small work areas, but should have sufficient strength and durability to allow rugged, reliable performance.

It is a further object of this invention to provide a connector which can be easily disassembled with a minimum number of tools.

It is a still further object of this invention to provide a connector of the above described type that allows the automatic stud driving tool to load at a plurality of locations within the body of the stud driving tool.

It is a still further object of the invention to provide such a connector in combination with an improved torque limiting device, and an improved automatic stud driving tool.

DETAILED DESCRIPTION OF THE INVENTION

Figure 1:
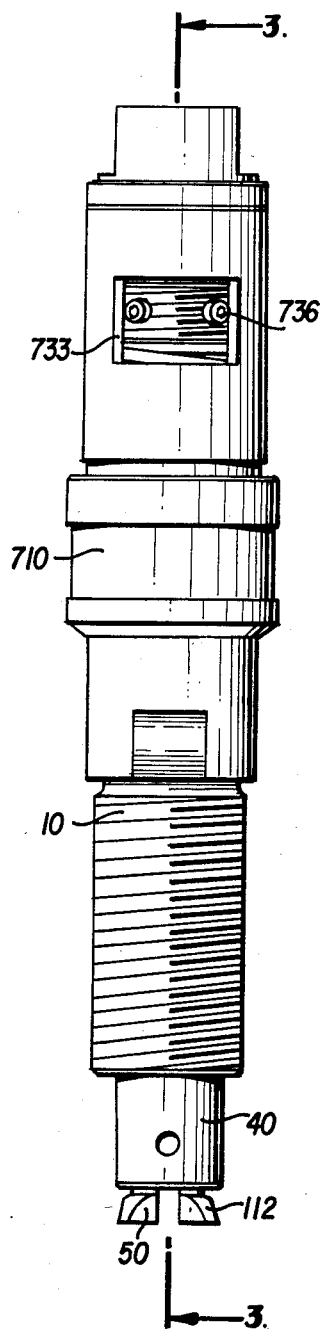
FIG. 1 is an exterior view of the combined tool and connector of the present invention.

The following is a detailed description of the preferred embodiment of the present invention, and should be understood to limit the appended claims by way of example only.

The torque limiting device of the present invention is very similar to the controlled torque apparatus described in application Ser. No. 221,322 filed Dec. 29, 1980, now U.S. Pat. No. 4,371,354, and the disclosure of that patent is hereby incorporated by reference.

The torque limiting apparatus has two major parts, a cylindrical base 710 and a cylindrical sleeve 712. Sleeve 712 is relatively rotatable to, but longitudinally secured within, base 710 as will be more fully explained later. An engaging means 714 is provided on the upper end of the tool to allow for connection to a torque supplier, while an adapter housing 170 is an integral part of the lower end of base 710. The adapter housing 170 forms a part of the connector of the present invention, as will be more fully explained later. The specific choice of the engaging means will of course depend on the specific use and torque supplier involved.

Sleeve 712 is longitudinally held in, but relatively rotatable to, base 710 by the cooperation of support bearings 724 within bearing race 728, which is recessed into the sidewall of base 710. Support bearings 724 are located in holes 726 through the sidewall of sleeve 712, and are held in place in the holes by disk 730. Disk 730 also serves as a spring shoe for spring 732 in a preferred embodiment, as will be more fully explained later. Thus, longitudinal movement of sleeve 712 is prevented by the engagement of support bearing 724 with bearing race 728, while relative rotation is not inhibited. The size and number of holes and support bearings will of course vary depending on the size of the apparatus being manufactured, and its intended use.

Torque is transmitted between base 710 and sleeve 712 through torque transmission bearings 720. These torque transmission bearings rest in part-spherical recesses 718 in base 710, and extend into apertures 722 in the bottom of sleeve 712. The sum of the depth of recesses 718 and the thickness of the bottom of base 710 should be equal to or substantially the same as the diameter of torque transmission bearing 720.

Vertical force from compression spring 732 is transmitted to torque transmission bearing 720 by means of spring shoe 730. This force urges torque transmission bearing 720 into partspherical recesses 718. As indicated above, in the preferred embodiment, the spring shoe also serves as a retaining disk for support bearing 724, although other suitable arrangements, such as a thin walled, hollow, cylindrical retainer and a thin spring shoe are readily ascertainable.

It is advantageous for the force applied by compression spring 732 to be variable. In the present invention, the force is preferably varied by means of adjuster 734, whose external threads can cooperate with an internally threaded sleeve 712. The adjuster can be readily rotated to adjust the spring force by insertion and movement of a long narrow object in threaded holes 738. This is facilitated by the plurality of threaded holes 738 and the provision of opening 733 into the side wall of sleeve 712. Removable set screws 736, which fit in threaded holes 738 and extend through opening 733, can secure the adjuster 34 against unintentional rotation. Upon the presence of excess torque between sleeve 712 and base 710, torque transmission bearings 720 are forced upwards against the pressure of spring 732. This allows the torque transmission bearings 720 to slip, and the sleeve thus rotates with respect to base 710. This provides an indication that the proper amount of torque has been applied and prevents the application of excessive torque.

The configuration and operation of the automatic stud driving tool portion of the present invention is likewise very similar to the automatic stud driving tool described in the application entitled "Automatic Stud Driving Tool," filed Feb. 14, 1983, now U.S. Pat. No. 4,513,643 and the contents of that patent are likewise hereby incorporated within this specification by reference.

The automatic stud driver according to the present invention is composed of a body 10; a driven head 30; carriage 40; two sets of balls in the carriage (two upper lock balls 44 and two lower lock balls 46); a set of jaws 50; and a plunger 60.

The body 10 is a cylindrical member, and may be provided with a uniform thread over most of the exterior surface thereof. The interior of the body comprises a cylindrical cavity of varying cross-sectional diameter. In the embodiment disclosed in the figures, the minimum diameter extends between the carriage ledge 14 and the bottom edge of the body. This minimum diameter is interrupted at an intermediate point by an annular enlargement 120 of the interior cavity of body 10, whose function will be more fully described below. The upper edge of annular enlargement 120 is provided with an angled camming surface 100.

The upper edge of the minimum diameter portion of the body cavity terminates at carriage ledge 14, where the diameter of the body cavity abruptly increases to a somewhat larger circular cross-section. This somewhat larger cross-section can similarly terminate abruptly at a head ledge 12, where the body cavity can be again enlarged to another circular cross-section. Alternately, the somewhat larger cross-section can continue to the upper edge of body 10.

Driven head 30 is disposed within the upper portion of the hollow body cavity, and has at its lower end an outside cylindrical circumference sufficient to provide a minor clearance between the upper portion of the body 10 and the lower portion of the driven head 30. The driven head 30 forms part of the connector between the upper and lower tools, and is rotatably secured within the body 10 in a manner that will be more fully explained below.

Carriage 40 is of roughly cylindrical shape, the majority of the exterior circumference thereof being sized sufficiently to allow sliding and rotational movement within the minimum diameter portion of the body cavity. The uppermost section of the carriage has an abrupt increase in cross-sectional diameter, thereby forming carriage head 41. The diameter of this carriage head is small enough to allow it to move past the head ledge 12, if such a head ledge 12 is used, but is too large to allow passage beyond carriage ledge 14. The axial length of carriage head 41 is substantially less than the axial length of the intermediate diameter of the body cavity, i.e. that portion between head ledge 12 and bottom surface of driven head 30.

Carriage 40 is therefore constrained to a limited axial movement within the hollow body cavity, the upper extent of such movement being defined by the position in which carriage head 41 contacts the bottom of driven head 30, the bottom extent defined by the position in which carriage head 41 contacts carriage ledge 14. Since both the exterior of the carriage and the surface of the body cavity are cylindrical, carriage 40 is free to rotate within body 10.

The interior of carriage 40 is a roughly cylindrical cavity 38, which communicates to the exterior of the carriage at the bottom thereof. In the preferred embodiment, the resulting wall of the carriage is pierced by four apertures, two diametrically opposed upper carriage apertures 45, and two diametrically opposed lower carriage apertures 47. The axial position of the upper carriage apertures are such that they are aligned with the enlargement 120 when the carriage head is in contact with the carriage ledge 14, but are also such that the upper carriage apertures 45 will not be aligned with enlargement 120 when carriage head 41 is in contact with the bottom of driven head 30. The lower carriage apertures 47 are axially positioned along the carriage 40 such that they are always aligned with the minimum diameter portion of the body cavity.

The lowermost portion of the carriage 40 extends below the bottom of body 10, and terminates in a specially contoured aperture. This aperture is provided with a closing contour 102, and a holding contour 104, whose functions will be more fully described below.

Figure 3:
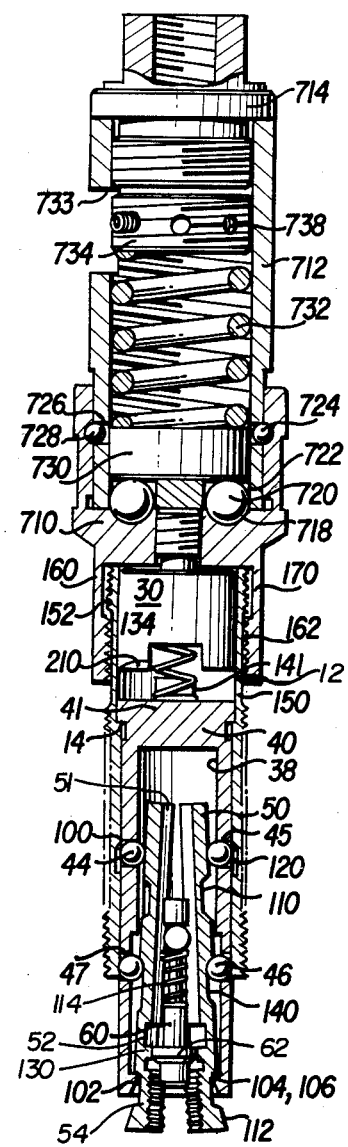
FIG. 3 is a cross-sectional view of the combination tool of the present invention.

The carriage 40 is the envelope for the assembly of jaws 50. Although these jaws are shown in cross-section in the drawing FIG. 3, it should be understood that each of jaws 50 is of a roughly semi-cylindrical shape similar to the jaws described in application Ser. No. 360,821, filed Mar. 24, 1982, now U.S. Pat. No. 4,470,329. On the inside planar surface of each jaw 50 is a semicircular cross-section groove 51 extending the length of the jaw. The lower section of the groove, the threaded section 54, is threaded to match the threads on a stud. Thus, when the jaws are closed onto the stud the threaded section 54 of the jaws 50 can grip the stud without damaging any of the threads on the stud.

Fitted into the upper section of the groove 51 above the threaded section 54 is the plunger means 60. The configuration of the plunger means 60 and its cooperation with the jaws 50 are exactly the same as is described in the application filed Feb. 14, 1983, entitled "Automatic Stud Driving Tool", now U.S. Pat. No. 4,513,643.

The exterior surfaces of the bottom portion of jaws 50 are provided with specialized surfaces. These specialized surfaces comprise closing contour 112, and holding contour 106. When a stud is inserted between jaws 50, they move upward into the interior of carriage 40. At this point closing contour 112 contacts closing contour 102, and the resulting interaction between these inclined surfaces causes the bottoms of jaws 50 to be wedged together, so that threaded section 54 may firmly grasp the stud.

When the stud is pulled toward the bottom of the tool, jaws 50 are extended out of carriage 40 by the firm grip between threaded section 54 and the threads of the stud, until the closing contours 102, 112 no longer force the bottoms of jaws 50 together. The inclined surfaces of the threads of the stud now interact with the inclined surfaces of the thread portions of threaded section 54, to wedge the bottoms of jaws 50 apart. The diameter defined by the distance between holding contours 106 on each jaw is now larger than the diameter of the carriage interior at holding contour 104. Jaws 50 are therefore securely held within carriage 40, and cannot be removed until they assume a closed position. At this open configuration, the distance between closing contours 112 of each jaw 50 is larger than the smaller internal diameter of the carriage 40 at closing contour 102. Because the jaws 50 are held apart by their cooperation with the plunger means 60, they are therefore prevented from moving back into carriage 40.

It is advantageous that holding contours 104 and 106, and closing contours 102 and 112 be constructed as a permanent portion of the carriage 40 and jaws 50, to thereby increase the reliability, strength and durability of the tool. These qualities may be further enhanced by forming each element and its respective contours from a single piece of material.

Inner locking groove 140 is provided in the exterior surface of each jaw 50. These inner locking grooves 140 are situated such that when the set of jaws 50 are assembled about plunger 60, the locking grooves 140 are positioned longitudinally along a portion of jaws 50, and are placed along the axial length of jaws 50 at a position sufficient to allow the grooves to be aligned with lower carriage apertures 47 both when holding contour 104 is engaged with holding contour 106, and when closing contour 102 is engaged with closing contour 112.

Lower lock balls 46 are disposed within lower carriage apertures 47, and are of a diameter sufficiently large so that they not only protrude into lower carriage apertures 47, but also protrude into inner locking grooves 140. Because these grooves 140 are substantially no wider than the diameter of lower lock balls 46, the assembly of jaws 50 is thereby rotationally interlocked with carriage 40. That is, any rotation applied to carriage 40 is transmitted by lower lock balls 46 to inner locking groove 140 of the jaw assembly. When the jaws assume their closed position, the bottoms of the grooves are substantially parallel to the axis of the tool.

Cross-section reduction 110 is located on the exterior surface of jaws 50 above inner locking groove 140. This cross-section reduction 110 can take the form of either longitudinally extending grooves similar in shape to those of inner locking grooves 140, or can take the form of a reduced diameter cross-section of the exterior of jaws 50. If the latter alternative is chosen, upper lock balls 44 will be unable to transmit torque applied to carriage 40 to jaws 50, but since this function is already performed by lower lock balls 46, the provision of a groove at cross-section reduction 110 is not strictly necessary.

Cross-section reduction 110 is positioned longitudinally on jaws 50 so that it is not aligned with upper carriage apertures 45 when holding contours 104 and 106 are fully engaged, but such that it comes into alignment with upper carriage apertures 45 when closing contour 102 has mated sufficiently with closing contour 112 to allow the stud to be grasped.

Upper lock balls 44 are disposed within upper carriage apertures 45, and have a diameter larger than the thickness of the carriage wall. Because of this larger dimension, a portion of the upper lock balls 44 must be accommodated by a space other than that provided by upper carriage apertures 45. When the jaws 50 are open, i.e. when holding contours 104 and 106 are fully engaged, cross-section reduction 110 is not aligned with the upper carriage apertures 45, and the larger dimension of the lock balls 44 must by necessity be accommodated within enlargement 120 of the body cavity. Once closing contours 102 and 112 have been engaged and the stud has been firmly gripped by the jaws 50, cross-section reduction 110 is now aligned with upper carriage apertures 45. This extra space allows camming surface 100 at the upper edge of enlargement 120 to cam upper lock balls 44 inward into cross-section reduction 110 and entirely out of enlargement 120. Further downward force applied to the tool then results in the carriage moving upward within the body cavity, until carriage head 41 contacts the lower surface of driven head 30.

Figure 2:
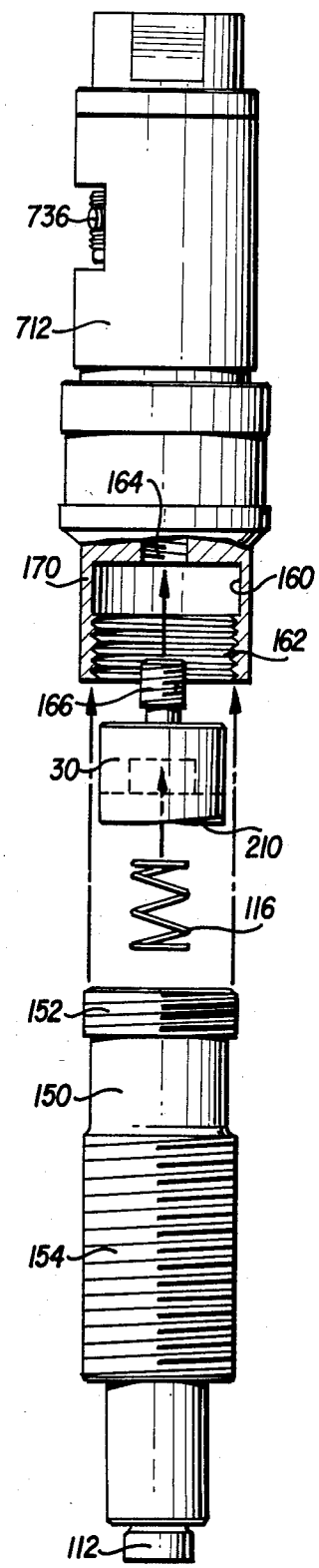
FIG. 2 is a partially exploded view of the present invention, showing the connector of the present invention in expanded form and partially in cross-section.

The upper surface of carriage head 41 and the lower surface of driven head 30 are provided with mating contours sufficient to allow a torsional interconnection between driven head 30 and carriage 40 when carriage head 41 contacts driven head 30. A specific example of contours sufficient for this purpose have been shown in FIGS. 2 and 3. As can be clearly seen, carriage head 41 is provided with an upstanding post 141 running across its diameter. The post 141 can have a square cross-section, best seen in FIG. 3. This upstanding post 141 is designed to mate with a corresponding slot 134 provided in the bottom surface of head 30. When post 141 engages slot 134, head 30 and carriage 40 are rotationally interlocked, so that a torque applied to head 30 can be transmitted to carriage 40.

The bottom surface of driven head 30 is preferably not flat, but is instead provided with two chamfers 210, that are symmetrically arranged with respect to the axis of the tool. Each of these chamfers 210 can take the form of an inclined surface, best shown in FIG. 2, which inclines from the bottommost portion of the driven head upward, away from carriage 40 and post 141, and continues to extend in this direction until it terminates at the radially outermost edge of slot 134. The chamfer 210 is shown on edge in FIG. 2. The direction of the incline of chamfer 210 is chosen such that when the driven head 30 is given an operational rotational input and the carriage has not yet begun to rotate, the distance between the top of post 141 and the directly opposite portion of the bottom of driven head becomes progressively larger as the chamfer 210 passes over post 141.

In operation, when the as yet non-rotating carriage head 41 and the post 141 advance toward driven head 30, the tip of post 141 contacts chamfer 210 and is allowed to smoothly advance upward to a point somewhat beyond the lowermost edge of the advancing slot 134. Post 141 is therefore advanced toward slot 134 to a point beyond that which would be allowed without chamfer 210, and as a result high speed engagement between slot 134 and post 141 is facilitated. Further, the square cross-section of post 141, in combination with chamfer 210, allows a more abrupt disengagement between slot 134 and post 141 upon withdrawal of the carriage. This decreases the tendency of the tool to impart axial impacts to both driven head 30 and carriage 40 when post 141 and slot 134 are disengaged, but are still in close enough proximity to interfere with each other as they pass during each rotation.

The height of post 141 is less than the distance that carriage 40 is capable of sliding axially within the body cavity. This results in carriage 40 and head 30 being rotationally disengaged when carriage head 41 is engaged with carriage ledge 14. Drive disengaging spring 116 is disposed between head 30 and carriage 40, thereby biasing these members into the rotationally disengaged position.

The height of post 141 and the axial spacing between driven head 30 and carriage head 41 are such that post 141 disengages from slot 134 when carriage head 41 is still a significant distance above carriage ledge 14. This results in upper carriage apertures 45 being nonaligned with enlargement 120 when the rotational drive supplied to carriage 40 by driven head 30 is first disengaged. At this point, due to the nonalignment between upper carriage apertures 45 and enlargement 120, jaws 50 remain in their closed position, firmly grasping the stud. The tool thus is prevented from driving the jaws 50 about the stud unless they are in the closed position.

The sequence of operation of the stud driving tool is exactly the same as that described in U.S. Pat. No. 4,513,643 entitled "Automatic Stud Driving Tool" filed Feb. 14, 1983.

The following describes the operation of the tool from the position it assumes immediately prior to being loaded onto an undriven stud. Jaws 50 are open, and holding contours 104 and 106 are fully engaged, thereby preventing the removal of jaws 50 from carriage 40. Upper lock balls 44 are contained within enlargement 120, thereby preventing the carriage from moving axially with respect to the body. Carriage head 41 is in contact with carriage ledge 14, and post 141 is therefore disengaged with slot 134. As the tool and stud approach each other, the stud contacts plunger 60, moving its annulus 62 away from blocking surface 130 and into closing groove 52. Further movement between the tool and the stud thereby causes closing contours 102 and 112 to act upon each other and close jaws 50 firmly about the stud.

The cross-section reduction 110 then comes into alignment with the upper carriage apertures and allows camming surface 100 to push upper lock balls 44 into cross-section reduction 110, and out of enlargement 120. The carriage is now free to move axially with respect to the body, and is beginning to approach driven head 30, although post 141 and slot 134 have not yet engaged.

The tool continues to advance toward the stud. When post 141 engages slot 134, the rotation supplied to driven head 30 drives the carriage, lower lock balls 46, and jaws 50, thereby imparting rotational motion to the stud. The stud begins to thread into the work piece.

The body will be prevented from advancing further toward the work piece. However, since post 141 and slot 134 continue to be engaged, the stud is further threaded into the work piece and serves to draw the carriage downward away from head 30. The carriage 40 moves sufficiently away from the head 30 to disengage post 141 and slot 134, the rotational motion imparted to the stud has ceased, and the implantation of the stud is completed.

To remove the tool it is simply necessary to pull the tool upwardly away from the stud and work piece. This serves to pull the jaws 50 in a direction away from carriage 40, thereby disengaging closing contours 102 and 112. When these contours have become sufficiently disengaged and the jaws 50 have been opened by the interaction between the threaded portions of the jaws 50 and the stud, spring 114 forces annulus 62 to engaged blocking surface 130. Holding contours 104 and 106 are now fully engaged and again prevent the removal of the jaws 50 from the tool.

The relative movement between the jaws and carriage has caused upper carriage apertures 45 to become aligned with enlargement 120, and has allowed the upper edge of cross-section reduction 110 to force upper lock balls 44 into enlargement 120. The stud has therefore been automatically disengaged from the tool, and the tool is ready for another cycle.

The connector of the present invention is disposed between the torque limiting apparatus and the automatic stud driving tool, and comprises a portion integral with the body 710 of the torque limiting device, a portion integral with body 10 of the automatic stud driving tool, and a portion integral with driven head 30.

The driven head 30 according to the present invention differs from the driven head disclosed in the above referenced application entitled "Automatic Stud Driving Tool" filed Feb. 14, 1983, now U.S. Pat. No. 4,513,643, in that the upper surface of the driven head 30 of the present invention has post 166 extending therefrom. This post is provided with external threads.

Correspondingly, the lower surface of base 710 of the torque limiting apparatus of the present invention is provided with a bore 164 extending thereinto. This bore 164 is provided with threads of the same configuration as the external threads of post 166. The driven head 30 may therefore be threaded into the bottom of base 710, and securely fixed thereto with respect to both axial and rotational movement.

The base 710 also has adapter housing 170 formed integrally therewith. This adapter housing 170 can take the form of a peripheral wall extending downward from the bottom of base 710. The interior of this adapter housing 170 is preferably cylindrical, and has at its lower most portion a threaded section 162. Immediately adjacent to the upper edge of this threaded section 162, the interior of adapter housing 170 is provided with an increased diameter portion 160, whose diameter is larger than the largest diameter encountered at threaded portion 162.

The body 10 of the automatic stud driving tool is provided at its upper most end with external threads 152 of the same configuration as internal threads 162. Immediately adjacent to the lower edge threaded portion 152, body 10 is provided with a reduced diameter section 150, whose diameter is smaller than the smallest diameter of threaded section 152. During assembly of body 10 into adapter housing 170, threaded section 152 mates with threaded section 162, and allows the upper most end of body 10 to be introduced within adapter housing 170 by a simple threading action.

However, when the upper most end of body 10 becomes sufficiently drawn into adapter housing 170, the threaded portion 152 is entirely opposed by increased diameter section 160, while threaded portion 162 is entirely opposed by reduced diameter portion 150. Body 10 is therefore free to rotate with respect to adapter housing 170, but is constrained from axial movement by the engagement of the lowermost portion of threaded area 152 with the uppermost edge of threaded area 162.

This allows the stud driving tool to be firmly secured to the torque limiting device in a simple, easily disassemblable manner. Further, because body 10 is rotatable with respect to adapter housing 170, and therefore also slot 134 on driven head 30, carriage 40 can load onto the driven head at any position of the body. That is, when carriage 40 is rotationally interlocked with driven head 30, body 10 remains rotatable with respect to both driven head 30 and carriage 40.

This rotatable coupling between body 10 and adapter housing 170 unavoidably results in some play between these two elements. However, this play can be minimized through the provision of codes tolerances between increased diameter section 160 and external threads 152, as well as between reduced diameter section 150 and internal threads 162. The alignment of body 10 and adapter housing 170 can be further ensured by providing external threads 152 to the uppermost edge of body 10, while providing internal threads 162 to the lowermost edge of adapter housing 170.

The axial movement of body 10 with respect to adapter housing 170 when the tool is fully assembled can be minimized by ensuring that as small a clearance as possible exists between the upper edge of internal threads 162 and the lower edge of external threads 152.

In operation, the spring 732 is preset by adjustable member 734 with sufficient tension to allow normal operating torques to be transmitted from the input of the torque limiting device to base 710, and thereby to driven head 30. This torque is then transmitted during the normal operating sequence of the stud driving tool to the stud, which is threaded into the workpiece. When this normal operating sequence is interrupted, for example due to a misalignment between the stud and workpiece, the torque encountered of the stud driving tool becomes abnormally high. This reaction torque is then transmitted to driven head 30, and to body 710, where it causes the rotational disengagement between sleeve 712 and body 710. The tool therefore prevents excessive torque being applied to any of the automatic stud driving tool, the stud, or the workpiece, thereby minimizing any damage that might occur due to the malfunction.

As a further example of the operation of the present invention, the torque limiting device can be preset to release at a torque somewhat less than that which will result in breakage of the stud. The stud can then be driven into a blind hole. When the stud contacts the bottom of blind hole, and the torque encountered by the stud driving tool increases substantially. When this torque reaches the preset value of the torque limiting device, the output of the torque limiting device is disengaged from the rotational input, and the resulting non-rotation of the stud driving tool indicates that the stud has been driven to its full extent.

Other modes of operation will be readily apparent to those skilled in the art.

I claim:

1. A connector between two rotary driven tools, an upper tool and a lower tool, wherein a rotational output of the upper tool is transmitted through said connector to the lower tool, and the lower tool has a carriage rotatably disposed within a lower tool body of the lower tool, the connector comprising:
   (i) an adaptor housing secured to the the upper tool for rotation therewith, said adaptor housing having a socket and being axially secured to said lower tool body at an internal surface of said socket of the adapter housing to permit said lower tool body to rotate relative to said adaptor housing; and
   (ii) a driven head axially secured to the adaptor housing for rotation therewith, but removable from the housing during dissassembly, the driven head being disposed within the socket in which the lower tool body is secured to the adapter housing, said driven head and said carriage each being provided with mating contours such that the driven head and the carriage can be selectively rotationally interconnected;
   (iii) whereby the rotational output of the upper tool is transmitted through the adapter housing, to the driven head, and then to the carriage.

2. The connector of claim 1, wherein free rotating means are provided for allowing the lower tool body to rotate freely with respect to both the lower tool carriage and the adapter housing.

3. The connector of claim 2, wherein the free rotating means comprises an externally threaded portion at the uppermost end of the lower tool body, a reduced diameter portion adjacent to the lower edge of said externally threaded portion, the reduced diameter portion having a diameter smaller than the smallest diameter of the externally threaded portion, an internally threaded portion at the lowermost end of said adapter housing, an increased diameter portion adjacent to the upper edge of said internally threaded portion, said increased diameter portion having a diameter larger than the largest diameter of the externally threaded portion, whereby the internal and external threads mesh when the lower tool body is introduced into said adapter housing, but when the uppermost edge of said lower tool body abuts the bottom of said socket, the internal threads are entirely opposite the reduced diameter portion, and the external threads are entirely opposite the increased diameter portion, allowing the lower tool body to rotate freely with respect to the adapter housing while preventing axial movement between the lower tool body and the adapter housing.

4. A connector as in claim 1, wherein the mating contour comprises a slot in the driven head and a square cross section post on the top surface of the carriage, the carriage being capable of axial movement with respect to the driven head to selectively engage and disengage the post with the slot, and wherein the contour of the axial facing lower surface of the driven head is chamfered to allow the post to approach the slot beyond the lowermost point of the driven head as the post rotates relative to said driven head and approaches engagement with said slot.

5. A connector as in claim 1, in combination with the lower tool, which is an automatic stud driving tool comprising:
   said lower tool body, said body being hollow and having an inner surface;
   said lower tool carrige, said carriage disposed within said body and having a longitudinal axis, the carriage provided with a cavity extending therethrough along said axis;
   a pair of opposed jaws provided partially within said cavity and capable of sliding simultaneously as a unit along the axis of said carriage, the jaws being substantially non-rotatable with respect to said carriage, means for assuring that the jaws are further capable of axially moving with respect to the carriage to at least two positions relative to each other, an open position and a closed position;
   the pair of jaws being provided with gripping means for gripping a stud in a non-rotatable manner when said jaws are in said closed position, and for releasing said stud when said jaws are in said open position;
   preventing means for positively preventing the jaws from moving from the open position to the closed position unless a stud is engaged with said gripping means;

holding means provided to prevent the removal of the jaws from the carriage driving normal operation when said jaws are in said open position, said holding means comprising a permanent holding contour on the surface said jaws and a permanent holding contour of the surface of said cavity, such that when the jaws assume their open position during normal operation the permanent holding contours abut and prevent removal of said jaws, but when said jaws assume their closed position the permanent holding contours do not abut and the jaws can be removed from said carriage such that said jaws are held within said carriage at the open position substantially only by said permanent contours;

wherein the carriage is axially movable with respect to said body; and the upper tool transmits rotation through the connector to the carriage to thereby rotate the jaws, to in turn rotate the stud into a work piece.

6. The connector as in claim 5, wherein the carriage of the automatic stud driving tool is axially moveable with respect to said body when said jaws are in a closed position, the axial movement of the carriage relative to the body serving to engage and disengage the mating contours, and means are provided for preventing such movement of the carriage relative to the body when said jaws are open.

7. The connector as in claim 6, wherein the carriage preventing means comprises at least one upper lock ball, an enlargement in the inner surface of the body, an upper aperture through the wall of the carriage and a portion of the jaws having a reduced cross-section, wherein each upper lock ball has a diameter larger than the thickness of the wall of the carriage, and is carried in the upper aperture in the carriage wall, such that when the jaws are in their open position, the enlargement in the body and the upper aperture are aligned, but the reduced cross-section of the jaws is not aligned therewith, thereby causing the upper lock ball to protrude into the enlargement and preventing the relative movement of the carriage and body.

8. An automatic stud driving tool in combination with a connector as in claim 7, wherein when the jaws are in their closed position, the reduction in cross-section is aligned with each upper aperture in the carriage wall, so that each upper lock ball can move out of the enlargement and thereby free the carriage to move axially with respect to the body.

9. The connector of claim 1, in combination with an upper tool which is a controlled torque apparatus comprising:
a first substantially cylindrical member having an open end, a closed end and a sidewall;
a second substantially cylindrical member having a closed end and a sidewall, the closed end of said second cylindrical member fitting within the open end of said first cylindrical member;
torque overload-responsive clutch means interposed between said first and second cylindrical members;
means for securing said second cylindrical member within said first cylindrical member, said securing means connecting said first cylindrical member to said second cylindrical member so that said first cylindrical member is longitudinally fixedly secured to said second cylindrical member but rotatable relative thereto and comprises:
an aperture through the sidewall of said second cylindrical member;
a ball bearing disposed in said aperture, the sidewall of said second cylindrical member having a thickness less tha the diameter of the ball bearing;
an annular bearing race formed on the inner surface of the sidewall of said first cylindrical member corresponding to said aperture; and
ball bearing retaining means located within said second cylinder to retain said ball bearing in said aperture.

10. A connector as in claim 1, in combination with an upper tool which is a controlled torque apparatus comprising:
a first substantially cylindrical member having an open end, a closed end and a sidewall;
first engaging means extending from the exterior of the closed end of said first cylindrical member;
a second substantially cylindrical member having an open end, a closed end and a sidewall, the closed end of said second cylindrical member fitting within the open end of said first cylindrical member;
second engaging means extending from the open end of said second cylindrical member;
adjustable torque overload-responsive clutch means interposed between said first and second cylindrical members;
means for securing said second cylindrical member within said first cylindrical member, said securing means connecting said first cylindrical member to said second cylindrical member so that said first cylindrical member is longitudinally fixedly secured to said second cylindrical member but rotatable relative thereto and comprises:
an aperture through the sidewall of said second cylindrical member;
a ball bearing disposed in said aperture, the sidewall of said second cylindrical member having a thickness less than the diameter of said ball bearing;
an annular bearing race formed on the inner surface of the sidewall of said first cylindrical member corresponding to said aperture; and
ball bearing retaining means located within said second cylindrical member to retain said ball bearing in said aperture.

11. A connector as in claim 1, in combination with an upper tool which is a controlled torque apparatus comprising:
a first substantially cylindrical member having an open end, a closed end and a sidewall;
first engaging means extending from the exterior of the closed end of said first cylindrical member;
a second substantially cylindrical member having an open end, a closed end and a sidewall, the closed end of said second cylindrical member fitting within the open end of said first cylindrical member;
second engaging means extending from the open end of said second cylindrical member;
adjustable torque overload-responsive means comprising:
a part-spherical recess on the inner surface of the closed end of said first cylindrical member;
a hole through the closed end of said second cylindrical member corresponding to said recess;

a torque transmitting bearing located in said recess and said hole;

a spring disposed within said second cylindrical member to apply force to said torque transmitting bearing; and adjustment means for chaning the force applied by said spring;

means for securing said second cylindrical member within said first cylindrical member, said securing means connecting said first cylindrical member to said second cylindrical member so that said first cylindrical member is longitudinally fixedly secured to said second cylindrical member but rotatable relative thereto and comprises:

an aperture through the sidewall of said second cylindrical member;

a ball bearing disposed in said aperture, the sidewall of said second cylindrical member having a thickness less than the diameter of the ball bearing;

an annular bearing race formed on the inner surface of the sidewall of said first cylindrical member corresponding to said aperture; and ball bearing retaining means located within said second cylindrical member to retain said ball bearing in said aperture.

12. A connector as in claim 1, in combination with an upper tool which is a controlled torque apparatus comprising:

a first substantially cylindrical member having an open end, a closed end and a sidewall;

first engaging means extending from the exterior of the closed end of said first cylindrical member;

a second substantially cylindrical member having an open end, a closed end and a sidewall, the closed end of said second cylindrical member fitting within the open end of said first cylindrical member;

second engaging means extending from the open end of said second cylindrical member;

adjustable torque overload-responsive means comprising:

a semi-spherical recess on the inner surface of the closed end of said first cylindrical member;

a hole through the closed end of said second cylindrical member corresponding to said recess;

a torque transmitting bearing located in said recess and said hole;

a spring disposed within said second cylindrical member to apply force to said torque transmitting bearing;

a substantially disk-shaped spring shoe disposed in said second cylindrical member between said spring and said torque transmitting bearing; and adjustment means to change the force applied by said spring;

means for securing said second cylindrical member within said first cylindrical member, said securing means connecting said first cylindrical member to said second cylindrical member so that first cylindrical member is longitudinally fixedly secured to said second cylindrical member but rotatable relative thereto and comprises:

an aperture through the sidewall of said second cylindrical member;

a ball bearing disposed in said aperture, the sidewall of said second cylindrical member having a thickness less than the diameter of said ball bearing;

an annular bearing race formed on the inner surface of the sidewall of said first cylindrical member corresponding to said aperture;

said spring shoe acting as a ball bearing retaining means to retain said ball bearing in said aperture.

13. A controlled torque apparatus as claimed in claim 11 wherein said second cylindrical member is internally threaded and said adjustment means comprises an externally threaded nut disposed within said second cylindrical member.

14. A controlled torque apparatus as claimed in claim 12 wherein said second cylindrical member is internally threaded and said adjustment means comprises an externally threaded nut disposed within said second cylindrical member.

15. The connector as in claim 1, in combination with a lower tool which comprises:

said lower tool body, said lower tool body being a hollow body defining an inner surface and having an axis;

the carriage, said carriage having a cavity therein disposed within said hollow body and capable of axial movement relative to the body;

a plurality of jaws disposed at least partially within said cavity and being axially movable relative to said carriage, the jaws being able to assume an open position and a closed position;

said driven head being engageable with the carriage when said carriage is at an upper position with respect to the body, but being disengaged from the carriage when the carriage is at a lower position;

carriage preventing means for preventing the carriage from moving from the lower position to the upper position when the jaws are in the open position, but allowing such movement of the carriage when the jaws are in the closed position, the carriage preventing means comprising an upper lock ball having a diameter greater than the thickness of the carriage wall, an upper aperture through the wall of the carriage partially containing the upper lock ball, an enlargement of the inner surface of the body, and a reduced cross-sectional area of the jaws, such that when the carriage is at the lower position, the enlargement is aligned with the upper aperture, and when the jaws are open the reduced cross-section is not aligned with the aperture, so that the upper lock ball must extend into the enlargement and thereby prevent axial movement of the carriage with respect to the body, but where, when the jaws are closed, the reduced cross-section is aligned with the upper aperture to allow the upper lock ball to move out of the enlargement and thereby free the carriage to move with respect to the body;

resilient biasing means for biasing the carriage toward the lower position, to thereby favor movement of the jaws with respect to the carriage over movement of the carriage with respect to the body; and means for preventing driving of the jaws about the stud unless the jaws are in the closed position, said means for preventing driving of the jaws including an upstanding post on one of the group of the carriage and the head and a mating slot in the other of the group of the carriage and the head, the height of the post being less than the axial distance between the upper and lower positions of the carriage such that the post engages the slot after the upper lock balls disengage from the enlargement.

16. The connector of claim 15 wherein the biasing means comprises a spring extending between the driven head and the carriage.

17. The connector of claim 15, wherein both the slot and post extend diametrically across the carriage and driven head, the post has a squared cross-section, and wherein the face of the element having the slot therein is chamfered, such that the distance between the face of the element and the post increases as the driven head is driven rotationally with respect to the carriage.

* * * * *